Jan. 8, 1929.
A. U. AYRES
1,698,488
DRIVING MECHANISM
Filed April 6, 1925
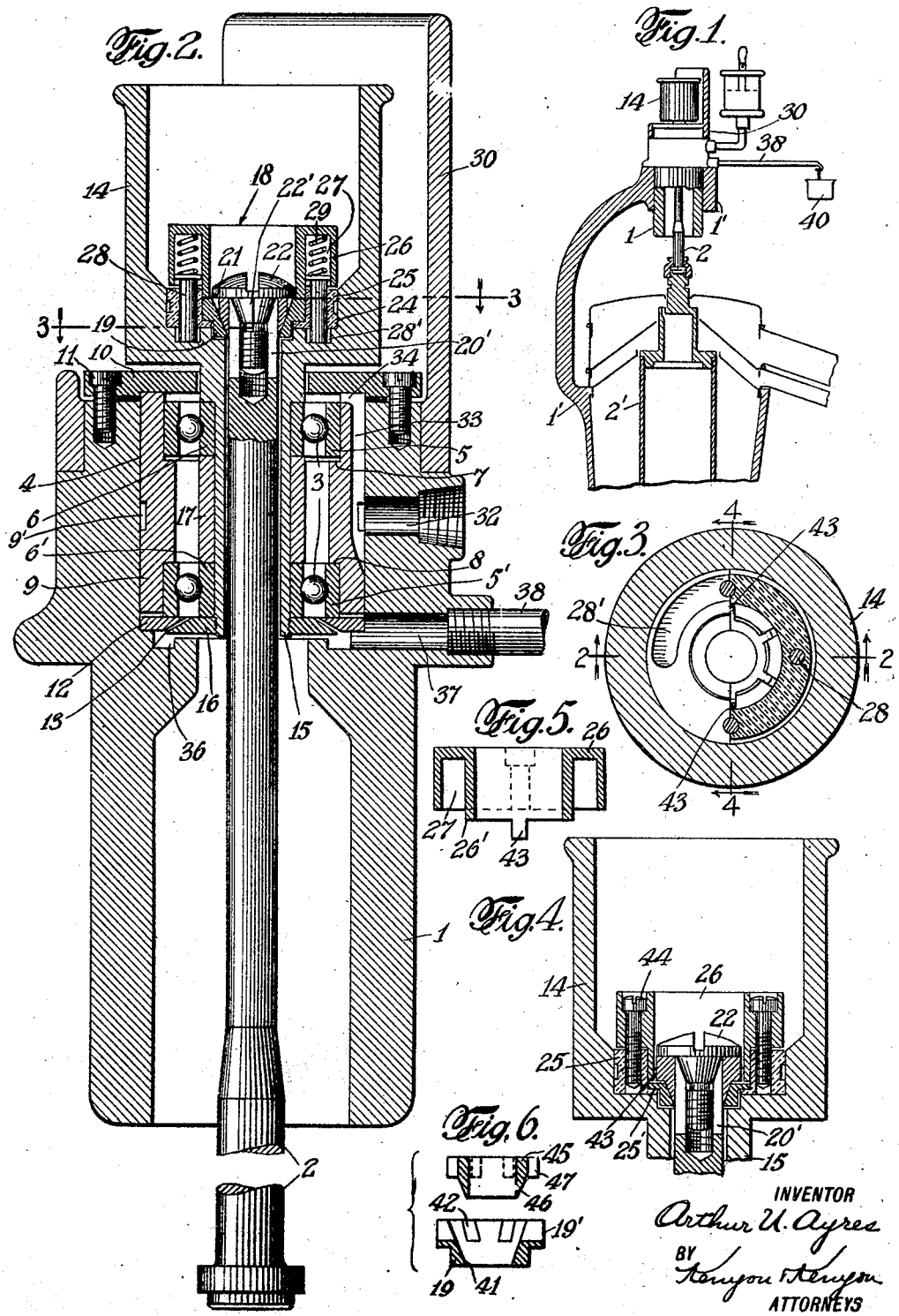
INVENTOR
Arthur U. Ayres
BY
Kenyon & Kenyon
ATTORNEYS Patented Jan. 8, 1929.

1,698,488

UNITED STATES PATENT OFFICE.

ARTHUR U. AYRES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE.

DRIVING MECHANISM.

Application filed April 6, 1925. Serial No. 20,961.

My invention relates to driving mechanism and is primarily designed for the purpose of driving shafts or spindles having a tendency to vibrate or wobble, being particularly adaptable to the driving of centrifugal devices.

An object of my invention is to provide mechanism for driving and supporting a rotating member that will avoid the difficulties and problems of operating such members at high speed, a further object of my invention being the provision of an improved bearing for use in such mechanism.

Another object of my invention is to provide a connection between such a rapidly rotating spindle and the supporting structure thereof that will permit a limited angular movement between parts thereof but prevent undesirable relative radial movement or misalignment.

Another object of my invention is to provide driving mechanism that will permit of continued rotation of the spindle and associated mechanism in case of failure of the main supporting bearing.

Another object of my invention is to provide a guide for the rotating spindle that will prevent undue wobbling thereof and at the same time reduce wear thereof to a minimum.

Another object of my invention is to provide a bearing for such mechanism that is readily lubricated.

Other objects of my invention will be apparent from the following description taken in connection with the accompanying drawings, in which Fig. 1 is a sectional view with parts broken away of a centrifugal machine showing the general application of a device embodying my invention.

Fig. 2 is a vertical sectional view of a driving mechanism embodying my invention; and Fig. 3 is a partial sectional view approximately on the line 3—3 of Fig. 2.

Fig. 4 is a sectional view on the line 4—4 of Fig. 3.

Fig. 5 is a sectional detail view on the line 2—2 of Fig. 3, and

Fig. 6 is a sectional detail view.

While my invention is illustrated in the drawings and described herein in connection with and as embodied in a centrifugal machine, to which machines it is particularly adaptable, it is understood that my invention is not limited to such use.

In the embodiment of my invention herein described for the purpose of disclosing same the driving mechanism includes a prime mover supported by a quill in a main bearing carried by a supporting frame, and a spindle extending through the quill and the bearing and having one end connected to the prime mover and the other end connected to the rotating bowl of a centrifugal machine. The connection between the spindle and the prime mover is so constructed as to provide for slight relative angular motion and to provide for continued rotation of the spindle in the event that the prime mover is stopped as by breakage of the bearing.

Referring to the drawings wherein an illustrative embodiment of my invention is shown, a supporting member 1 is mounted in a frame 1' that is provided with a base not shown. In the construction shown in the drawing a spindle 2 supports a centrifugal bowl 2' for rotation. A driving pulley or prime mover 14 is provided with a quill or tubular extension 15 that is supported by ball bearings 3 in the supporting member 1. Within a cylindrical chamber 4 in the supporting member 1, is positioned a thrust ring 12 upon which rests an outer ball race 5' that is held in place by a sleeve 9 that fits within the cylindrical chamber. The sleeve 9 is held in the chamber by a plate 10 that is fastened to the supporting member 1 as by screws 11. The outer ball race 5' fits within an enlargement 8 in the lower end of the sleeve 9 and an outer ball race 5 fits within an enlargement 7 in the upper end of the sleeve 9. An inner ball race 6, a spacing sleeve 17 and inner ball race 6' surround the quill 15 and are held in place thereon by means of a ring or nut 16 threaded onto the quill 15. The opening in the ring 12 flares downwardly and the nut 16 tapers upwardly to provide the space 13 for the discharge of lubricant into the annular groove 36 from which it passes out through the opening 37 and the pipe 38 into the collecting tank 40. For the lubrication of the bearing the supporting member 1 is provided with an oil passage 32 and the sleeve 9 is provided with an annular groove 9' registering with the opening 32 and a longitudinal groove 33 leading to a notch 34 in the upper edge of sleeve 9. The passage 32 conducts oil into the groove 9' from which it passes through the groove 33 and the notch 34 and then down over the ball bearings 3 and through the passage 13 into the chamber 36 from which it is conducted by the outlet passage 37 and the pipe 38.

The prime mover 14 is provided in its lower portion with a circular opening 24 within which is positioned a bronze ring or body member 25. A cap member 26 is positioned over the body member 25 and is provided with openings 27 containing plungers or pawls 28 that pass through openings in the body 25 and by means of the springs 29 are forced downward into ratchet openings 28' formed in the prime mover 14. An outer clutch member 19 shown in cross section in Fig. 6 is positioned within the ring 25 and a flange 19' of the outer clutch member rests upon an inwardly extending flange 25' of the ring or body member 25. The clutch member 19 is provided with a conical opening 41 and with radial slots 42. The cap 26 is provided with a downwardly extending flange 26' that rests upon the top of the flange 19' and with one or more downwardly extending lugs 43 that extend into slots 42 of the clutch member 19. The cap 26 is held to the ring or body member 25 by means of screws 44 and the flange 19' of the clutch member 19 is held between the flange 26' on the cap 26 and the flange 25' on the body member 25 while the lugs 43 fitting into slots 42 prevent relative rotation of the clutch member 19 with respect to the body member and cap. The upper end of the spindle 2 is provided with a slot 20' and has fitted around it the inner clutch member 45. The screw 22 has a conical surface 22' that spreads the slotted end of the spindle 2 bringing it into close engagement with the ring-like inner clutch member 45. The clutch member 45 has a conical surface 46 corresponding to the conical surface 41 of the outer clutch member and it has radial lugs 47 fitting within the notches 42 of the outer clutch member. The lugs 47 are so proportioned as to provide a clearance between their ends and the inner surface of the cap 26.

From the foregoing it will be apparent that I have provided driving mechanism for a spindle wherein a bearing is provided for the prime mover of the driving mechanism and a coupling between the driven member or spindle and the prime mover is so constructed as to permit slight relative angular motion without misalignment and to permit overrunning of the driven member if the prime mover is stopped or the bearing thereof binds. In this connection it is to be noted that the outer ball races of the bearing are stationary so that the moving parts thereof have a relatively low peripheral speed and the bearing is so positioned that the spindle or driven member may be short to the end that vibrations thereof will not set up undesirable bending. In a construction embodying my invention the driven member or spindle 2 that is subject to flexure and angular displacement during operation at high speed will be guided by the quill 15 that rotates with the spindle with the result that there will be no friction between the spindle and the quill 15 that guides or limits its flexure and angular displacement that may be due to vibration or wobbling of a centrifugal bowl that seeks to rotate about different axes while being brought up to speed. The clutch between the spindle and the prime mover will by reason of the conical engaging surface 41 and 46 thereof, automatically align and center the spindle with respect to the quill 15 and the bearing that supports the quill and will through the engagement of the lugs 47 in the slots 42 provide a positive coupling that will not interfere with flexure of the spindle 2. If the prime mover is stopped for any reason the inertia of the spindle and parts connected therewith will not cause any breakage of parts because the pawl pins 28 acting in the ratchet openings 28' will permit the spindle to over-run the prime mover 14, the weight of the spindle and parts supported thereby being carried by the ring 25 that is made of bronze or other friction resisting material. If desired a guard 30 may be placed around the prime mover 14.

While I have described one embodiment of my invention in great detail I do not intend that my invention shall be limited to the details set forth but intend that my invention shall include such variations and modifications as fall within the hereunto appended claims. In this connection it is to be noted that mechanism embodying my invention comprises means for transmitting power from a driving member to a spindle which includes a positive driving over-running connection, a positive driving articulated connection, and means acting to center the spindle with respect to the driving element at the point of connection but the spindle is entirely free for articulation without intervention of springs or other resilient parts, the ring 25 and parts connected thereto comprising a power transmitting element which has a positive driving over-running connection with the prime mover and a positive driving articulated connection with the spindle.

What I claim and desire to secure by Letters Patent of the United States is:

1. A mechanism for driving high speed parts such as the rotor of high speed centrifuges, comprising a quill member, a bearing supporting said quill member for rotation and against vibration, a spindle member passing through said quill member in spaced relation therewith, and a driving connection between said members and comprising a power transmitting element, a one-way clutch between said element and one of said members, a positive-driving articulated universal connection between said element and the other of said members, and means acting to center one of said members with respect to said element.

2. A mechanism for driving high speed parts such as the rotor of high speed centrifuges, comprising a quill member, a bearing supporting said quill member for rotation and against vibration, a spindle member passing through said quill member in spaced relation therewith, and a driving connection between said members and comprising a power transmitting element, a one-way clutch between said element and one of said members and a positive-driving articulated universal connection between said element and the other of said members.

3. A mechanism for driving high speed parts such as the rotor of high speed centrifuges, comprising a quill member, a bearing supporting said quill member for rotation and against vibration, a spindle member passing through said quill member in spaced relation therewith, a driving connection between said members and having a positive-driving over-running connection with one of said members and a positive-driving articulated universal connection with the other of said members, and being concentric to one of said members, and means acting to center the other of said members with respect to said driving connection.

4. A mechanism for driving high speed parts such as the rotor of high speed centrifuges, comprising a quill member, a bearing supporting said quill member for rotation and against vibration, a spindle member passing through said quill member in spaced relation therewith, and a driving connection between said members and having a positive-driving over-running connection with one of said members and a positive-driving articulated universal connection with the other of said members.

5. A mechanism for driving high speed parts such as the rotor of high speed centrifuges, comprising a quill, a bearing supporting said quill for rotation on a vertical axis, a spindle passing through said quill in spaced relation thereto, a positive-driving over-running connection suspending said spindle for free articulation within said quill, and having non-resilient means for centering said spindle in said quill at said connection.

6. A mechanism for driving high speed parts such as the rotor of high speed centrifuges, comprising a quill, a bearing supporting said quill for rotation on a vertical axis, a spindle passing through said quill in spaced relation thereto, and a positive-driving over-running connection suspending said spindle for free articulation within said quill.

7. A mechanism for driving high speed parts such as the rotor of high speed centrifuges, comprising a quill, a bearing supporting said quill for rotation and against vibration, a spindle passing through said quill in spaced relation thereto, and a driving connection between said spindle and said quill and comprising a positive-driving over-running connection with said quill and a positive-driving articulated universal connection with said spindle.

In testimony whereof, I have signed my name to this specification.

ARTHUR U. AYRES.